United States Patent [19]

Cvek

[11] Patent Number: 4,712,462
[45] Date of Patent: Dec. 15, 1987

[54] MODELMAKER'S MITER JIG

[76] Inventor: Sava Cvek, 9 Charlesbank Rd., Newton, Mass. 02158

[21] Appl. No.: 811,021

[22] Filed: Dec. 19, 1985

[51] Int. Cl.$^4$ ............................................. B27B 21/00
[52] U.S. Cl. ........................................ 83/762; 86/468; 269/290
[58] Field of Search ................................. 83/761–767, 83/468; 269/288–295

[56] References Cited

U.S. PATENT DOCUMENTS

| | | | |
|---|---|---|---|
| 506,433 | 10/1893 | King | 83/767 |
| 856,403 | 6/1907 | Hubbard et al. | 83/468 |
| 1,732,045 | 10/1929 | Gracey | 83/762 |
| 2,102,292 | 12/1937 | St. Louis et al. | 269/291 |
| 2,940,349 | 6/1960 | York et al. | 83/468 X |
| 3,590,891 | 7/1971 | Guglielmo | 83/762 |
| 3,935,779 | 2/1976 | Hildebrandt et al. | 83/762 |

Primary Examiner—Frank T. Yost
Attorney, Agent, or Firm—Lahive & Cockfield

[57] ABSTRACT

A modelmaker's miter jig has a work support surface and includes, in one aspect, a recessed rule slideable in a channel formed in the work support surface, and a stop member mounted on the rule and protruding above the support surface. A lock secures the rule and stop so as to register a workpiece in a desired relation to a saw guide. In another aspect, the jig includes a base member dependent from the work surface and having a clamp-engaging face for receiving a clamp to removably mount the jig on a table top. A preferred embodiment is formed as an extrusion.

9 Claims, 15 Drawing Figures

MODELMAKER'S MITER JIG

BACKGROUND OF THE INVENTION

The present invention relates to jigs for aligning a workpiece with respect to a handsaw, and relates more particularly to a modelmaker's jig for performing miter cuts.

A conventional miter box consists of an open channel-like structure. A workpiece rests on the floor of the channel, and a plurality of slots in opposing channel walls guide a saw at a fixed angle across the workpiece. Conventionally, the slots define cuts of 45, 90 and 135 degrees across the channel.

In lieu of opposing slotted walls for guiding the saw, it is possible to have a saw-guiding frame pivotally mounted on a vertical shaft. The frame may be locked at any position, so as to permit the alignment of the saw at any selected angle. Miter boxes with such a pivoting saw frame construction generally include one vertical side wall, against which an edge of the workpiece is pressed to align it.

Figure 1A:
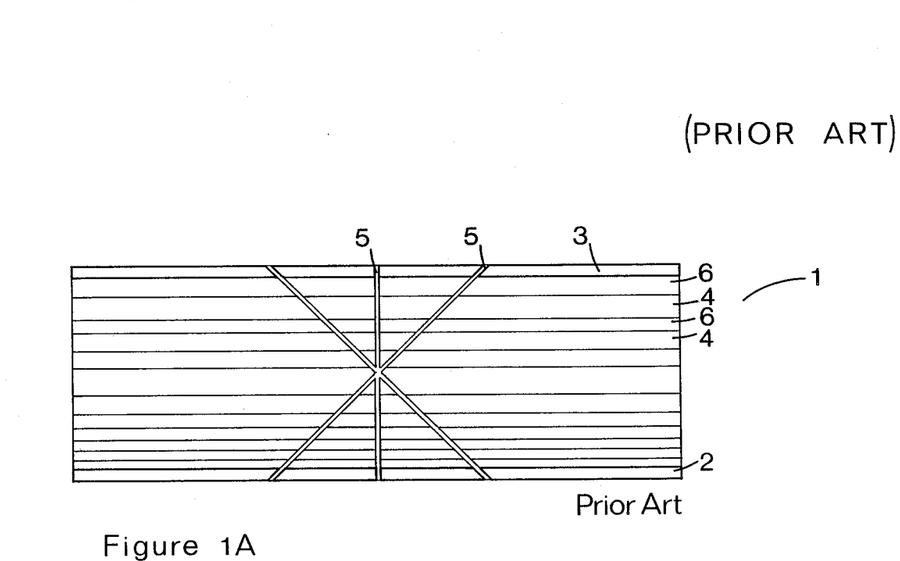
FIGS. 1A–1C show a prior art modelmaker's miter box.
Figure 1B:
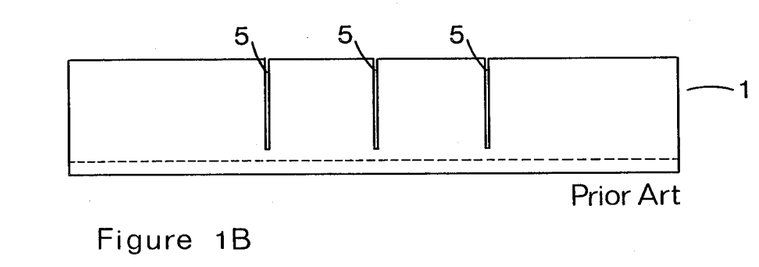
Figure 1C:
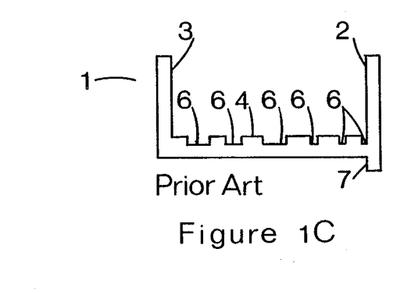

FIGS. 1A, 1B and 1C show, respectively a top, side and cross-sectional view of a prior art modelmaker's jig for performing miter cuts. One such jig 1 is sold in the United States by X-ACTO as their model No. 7533 miter box, and has overall dimensions of approximately 5 cm. width×5 cm. height×15 cm. length. This jig 1 has front and back walls 2,3 on opposing sides of floor 4, defining a channel for aligning a workpiece. Slots 5 in walls 2,3 guide a saw across the floor 4 for making miter cuts in a workpiece (not shown) supported on the floor. This jig is widely accepted by modelmakers for performing miter cuts.

Nonetheless it has drawbacks. The workpiece, which is generally a small, e.g., 0.5–1.0 cm. round or rectangular rod stock, or narrow sheet strip, must be manually aligned against the wall 2 or 3 with one hand, in registry with a cut, while the other hand moves the saw. During this operation pressure must be exerted against the miter box to prevent its sliding about on the tabletop. These constraints are partially addressed in the device of FIGS. 1A–1C. First, a plurality of graduated grooves 6 in the floor 4 hold workpieces of different widths in a proper orientation. Second, a flange 7 extending below the floor 4, may be butted up against the edge of a tabletop, thus permitting the box to be maintained in reasonably fixed alignment by the pressures exerted by the saw and by the hand holding the workpiece. Each of these improvements to the classical miter box design makes its use easier. However, because the box must be held down, and the workpiece first marked, then aligned, then held in position before commencing the saw cut, working with the prior art box requires care.

OBJECTS AND SUMMARY OF THE INVENTION

It is an object of the invention to provide a jig for miter cuts.

It is another object of the invention to provide a jig which is light yet stable and convenient to use for right and left-handed cuts.

It is another object of the invention to provide a jig adjustable to permit plural identical miter cuts on different workpieces.

It is another object of the invention to provide a modelmaker's jig of a new and ornamental design.

It is another object of the invention to provide a conversion kit to adapt a conventional miter box so as to attain one or more of the aforesaid objects.

These and other features of the invention are realized in one embodiment by providing a miter box having a work support surface and a guide wall rising therefrom, together with a dependent securing member extending downwardly from the support surface. The guide wall includes means for guiding a saw along a selected miter cut. The dependent member includes a clamp-receiving face which removably engages a clamp for securing the box to a table. In another embodiment the work support surface has a channel formed therein. A work stop mounts on a rule slideably fitted in the channel, with the workstop extending above the support surface for butting against a workpiece. Lock means locks the rule in position, for performing plural identical cuts. A conversion kit for converting a conventional miter box to a jig according to the invention is shown.

BRIEF DESCRIPTION OF THE DRAWINGS

These and other features of the invention will be understood by reference to the drawings, in which.

DETAILED DESCRIPTION

Figure 2:
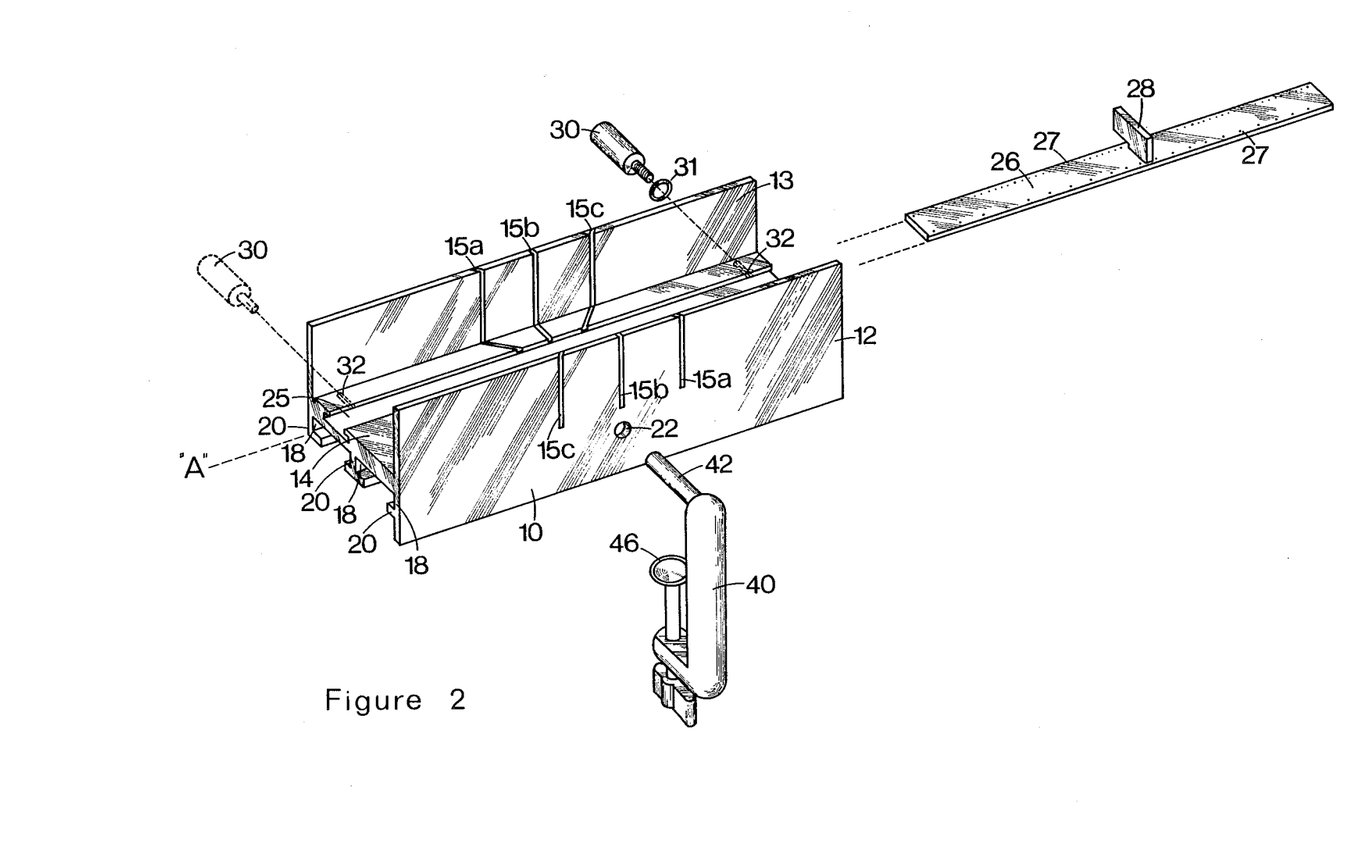
FIG. 2 shows a perspective view of a preferred embodiment of the invention.

FIG. 2 is a perspective view of a preferred embodiment of the invention, comprising a work-holding jig 10 and clamp 40. Jig 10 has some elements similar to the prior art box 1, including a floor portion 14, and proximal and distal walls 12,13, respectively, defining a generally channel-shaped upper portion aligned along an axis designated "A" in the figure. Opposed slots 15a, 15b, etc. in the opposing walls 12, 13 define a range of fixed angular cuts across the axis A over the floor 14.

Unlike the device of FIG. 1, jig 10 has a dependent securing member 18 extending downwardly from floor 14 and including pedestal-like portions 20 defining a substantially planar support contact surface. Dependent securing member 18 of the preferred embodiment includes an aperture therethrough, the inner face of which is a clamp engaging surface 22. A clamp 40, is adapted to engage surface 22. Clamp 40 has a first portion 42 for removably engaging surface 22 and an opposing portion 46 for fastening about a table top so as to secure the jig thereupon.

The floor 14 of jig 10 has a T-channel 25 formed therein, in which a rule 26 is slideably mounted. Rule 26 preferably includes graduated markings 27, which may include different scales on opposing edges thereof. The scales may be in inches and centimeters, or may be fine and coarse graduations of a single measurement system. For modelmaking, preferably rule 26 is equipped with interchangeable measuring strips having scaled graduations thereon, each strip being graduated to a different scale ratio, like an architect's or engineer's scale. Rule 26 is recessed below the top face of the floor 14, so that it does not contact the teeth of the saw. Mounted on top of rule 26 midway along its length is a stop member 28, which extends above floor 14 for contacting an end of a workpiece. One or more screws 30 mount in holes 32 for locking the rule in a desired position. Annular rubber dust seal 31 fits about screw 30 in hole 32. In this manner the stop 28 may be positioned at a selected distance from a cut line, for cutting one or more pieces of the selected length, without first marking the cut dimension on the workpiece.

Figures 3, 5:
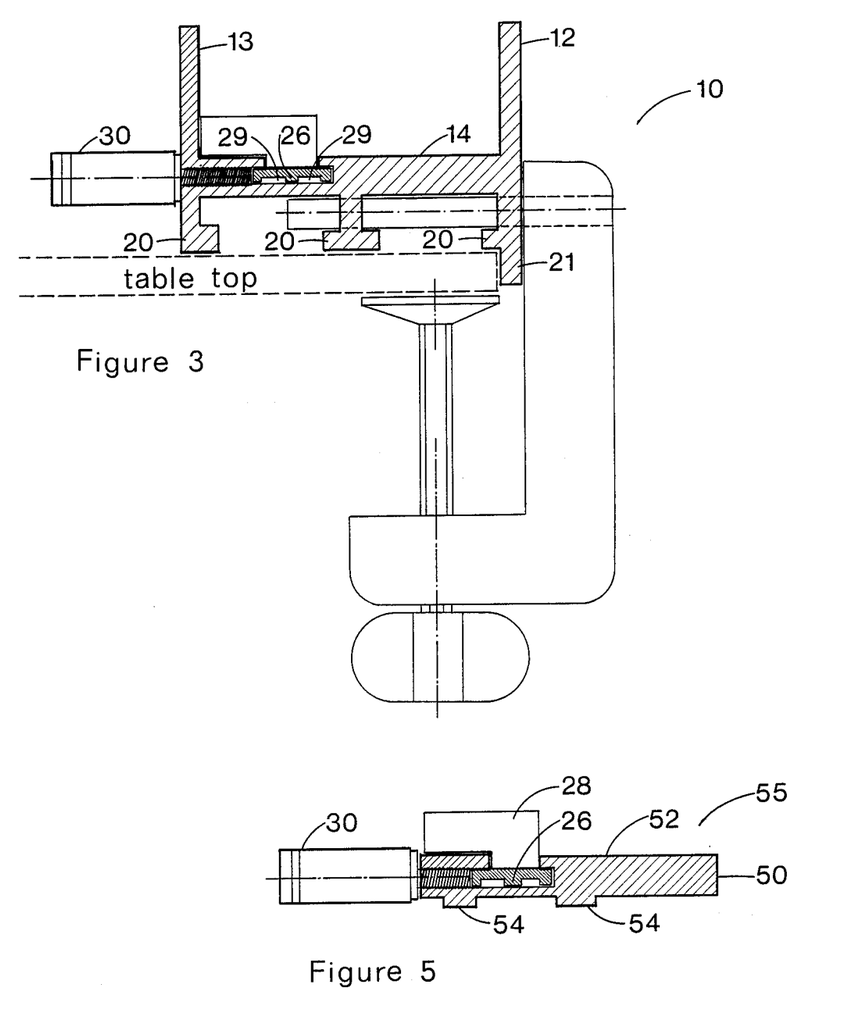
FIG. 3 shows a section of the jig of FIG. 2.
FIG. 5 shows a section of a conversion kit, corresponding to the section of FIG. 3.

FIG. 3 shows a cross sectional view of the jig 10 of FIG. 2. Walls 12, 13 extend upward from the workpiece-supporting floor 14, and pedestal-like support members 20 extend downward therefrom. Along the proximal wall 12, a flange 21 extends below member 20 to maintain the jig at the edge of a tabletop, shown in phantom. Preferably the walls, floor including the T-channel, support members, and flange are all features of a unitary extruded body, formed, e.g., of aluminum or plastic. With such a construction, the only machining steps necessary in manufacturing the jig are to form slots 15a, b, etc., to drill the clamp-receiving aperture 22, and drill and tap holes for the locking screws 30.

FIG. 3 also shows the cross section of a preferred form of the rule 26. The lower surface of rule 26 includes one or more longitudinal recessed portions 29, so as to reduce frictional drag and prevent jamming with saw chips or dust.

Figure 4A:
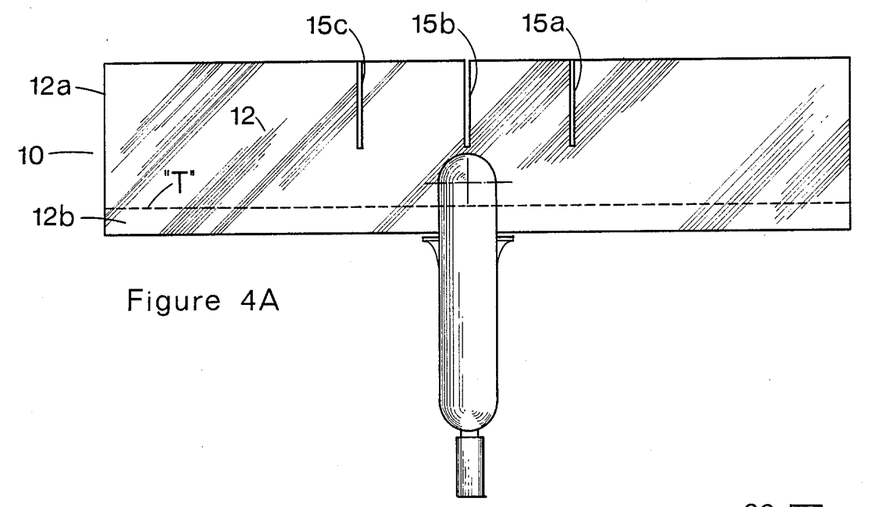
FIG. 4A shows a side view of the jig of FIG. 2.

FIG. 4A shows a side view of the jig 10 of FIGS. 2 and 3 from the proximal side, showing the full outside face of the proximal wall 12. Proximal wall 12 of extruded jig 10 may be conceptualized as having an upper portion 12A lying above the plane of the tabletop on which the jig is supported, i.e. the plane defined by the lower surface of the pedestals 20, and a lower portion 12B lying below the tabletop and constituting the flange 21 of FIG. 3. The tabletop is indicated schematically by the line T.

Figure 3A:
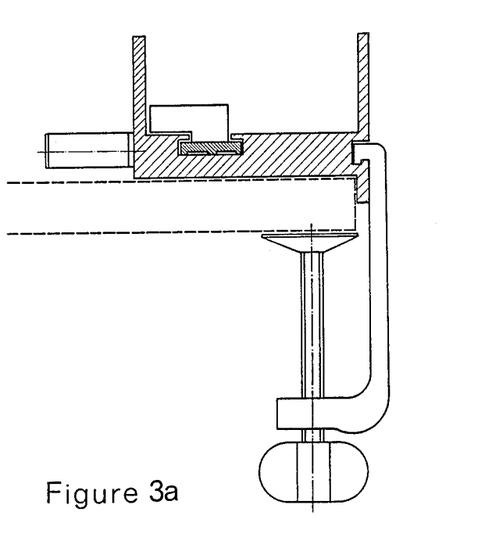
FIG. 3A shows a section identical to that of FIG. 3, of an alternative embodiment.
Figure 3B:
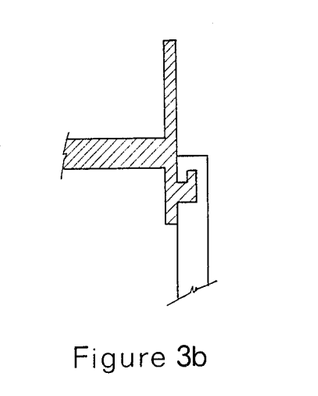
FIGS. 3B,3C show variations of the clamp features of embodiments similar to that of FIG. 3A in enlarged detail.
Figure 3C:
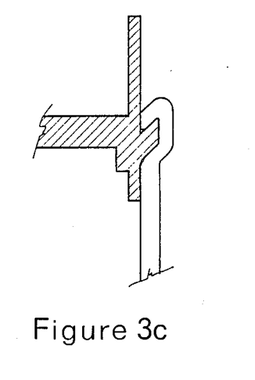
Figure 3D:
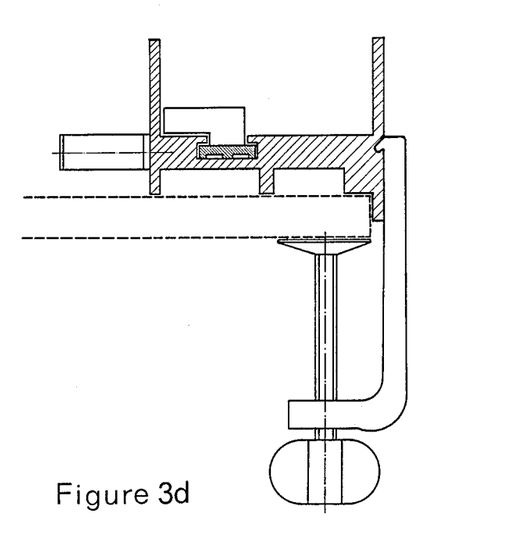
FIG. 3D shows another section of a similar variation.

FIG. 3A shows a section from a view identical to that of FIG. 3 of an alternative embodiment of the device. In this embodiment, the clamp engaging face 22' is a channel formed in an extruded body of the miter jig. The clamp 40' has a mating end portion 42' which engages channel 22'. Clamp 40' is itself a "slice" of an extruded C-shaped extrusion. Details of alternative clamp engaging geometrics of the portion of the miter jig well and the mating portion of the clamp are shown in FIGS. 3B, 3C as elements 22'', 42'' and 22''', 42''' respectively. In each case both the jig body and the clamp are substantially fabricated as extrusions. FIG. 3D shows another variation, corresponding elements thereof having corresponding reference numerals 22'''', 42''''.

Figure 4B:
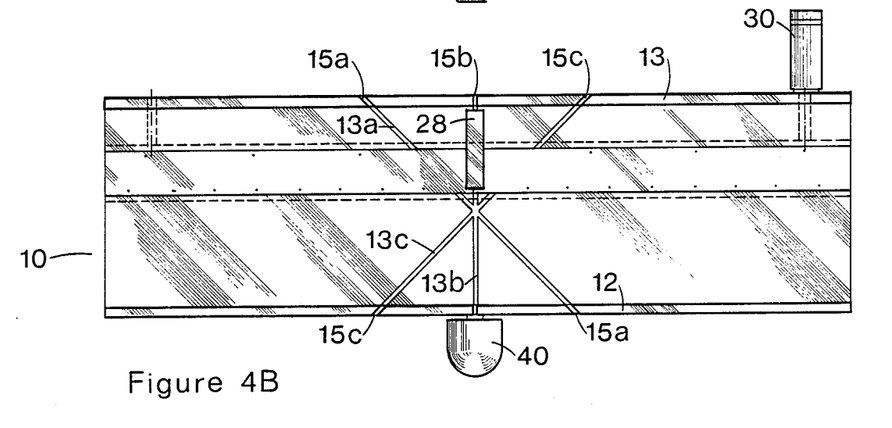
FIGS. 4B shows a top view of the jig of FIG. 2.

FIG. 4B shows a top view of the jig 10 of FIG. 2, with corresponding elements numbered identically. Cut lines 13a, 13b, 13c mark the cuts defined by opposing pairs of slots 15a, 15b, 15c respectively. The workstop 28 extends from the rule to within several millimeters of distal wall 13, so that a workpiece butted against the stop may simultaneously be pressed against wall 13, by hand, to secure it against vibration. This configuration allows visibility of both the cut lines and the rule graduations, and permits the rule to be set at exactly determined lengths, or to be conveniently reset by an exactly measured amount, when necessary, e.g., to trim an erroneously cut piece.

Figure 4C:
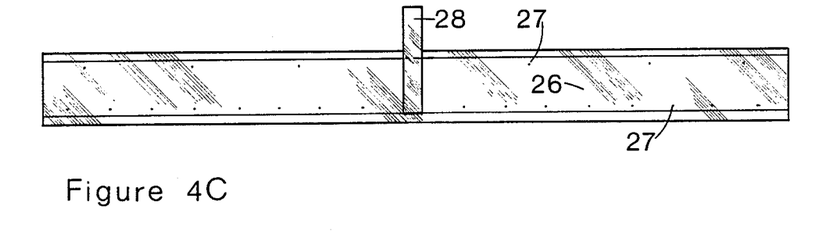
FIG. 4C shows a top view of the work stop and rule of the jig of FIG. 2.

FIG. 4C shows a top view of the rule 26, with the stop 28 centered thereon. For cutting, stop 28 will normally be pushed to one or the other end of jig 10, and locked in place by the lockscrew 30. Accordingly to prevent undue wobble of the rule at extreme displacements, and to permit the metered cutting of workpieces longer than the jig 10, it is desirable to make rule 26 longer than jig 10. In the preferred embodiment, the miter box portion of jig 10 is approximately 5 cm. × 5 cm. × 15 cm. long, and a rule 26 is provided having a length of between 20–50 cm., and preferably approximately 40 cm. Workpieces longer than approximately 20 cm. may then be cut without using the stop 28, by holding them against the proximal wall 12, as in the prior art box of FIG. 1.

Figure 6A:
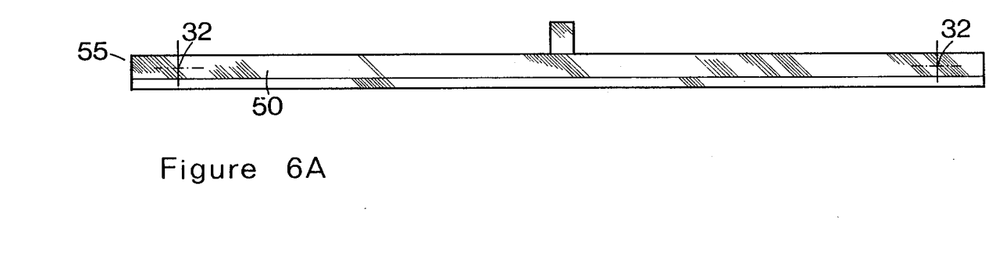
FIGS. 6A, 6B show side and top views of the conversion kit.
Figure 6B:
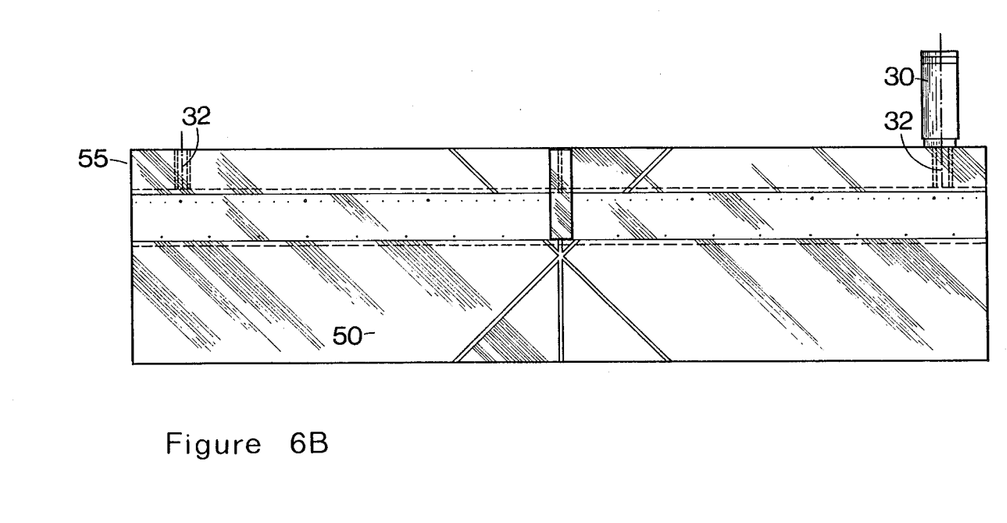

The invention also includes a conversion bed for converting a conventional jig to include a support surface having the rule and workstop features described above. Such a conversion kit 55 is shown in FIGS. 5, 6A–6B. FIG. 5 is a cross-sectional view, corresponding to the view of FIG. 3, of a conversion kit, which may be fitted into the prior art miter box shown in FIGS. 1A–1C. A bed body 50 includes a flat upper work support surface 52, and a lower surface having protruding lands 54. Lands 54 are configured to mate with one or more of the grooves (6, FIG. 1C) of the prior art miter box. Alternatively, the lower surface of bed 50 may be flat. Body 50 includes a T-channel, like channel 25 of jig 10, for holding a rule 26 with workstop 28. Bed body 50 is drilled and threaded, like jig 10 as shown in FIG. 4B, to receive a lockscrew 30 at a location near each end of the body 50, for pressing against the rule and locking it in position.

FIG. 6A, 6B, show side and top views of the conversion kit respectively. The locations of threaded holes 32 for the lockscrew 30 are shown. Body 50 does not however require the walls 12, 13 and dependent support members 20 or flange 21 of jig 10, since these elements are provided by the prior art box, FIGS. 1A–1C. Body 50 is installed in the prior art jig 1 by drilling access holes through the jig wall for the lockscrew holes 32, securing bed 50 in alignment on the floor 4 of the jig 1, and inserting the lockscrew 30 through the wall of the jig 1 into a screwhole 32. The bed 50 is preferably secured to the floor of the conventional jig by drilling and tapping it from below, and bolting it down. Alternatively bed 50 may be cemented onto floor 4. The rule 26 used in the conversion bed is identical to the rule of the jig 10, previously described.

Like jig 10, conversion body 50 is preferably formed as an extrusion, so as to require few machining or special fabrication steps, and to permit the ready construction or conversion of modelmakers jigs in a variety of lengths. Suitable materials for forming jig 10 and rule 26 are, e.g., aluminum, acrylics and other plastics. Non-extruded jigs can also be fabricated of hardwoods. Various modifications of the basic construction may be made. For example the lockscrew 30 may bear against a soft plastic rod, now shown, which in turn contacts rule 26, so that the edge of rule 26 is not worn or dented by the pressure of locking. Other lock mechanisms, such as lever-operated cam locks, may be adapted to lock the rule. Similarly the preferred clamping mechanism may be replaced by providing a different clamp receiving surface 22 and clamp 40. Furthermore, it will be appreciated that while reference herein has been made to a saw, and the prior art devices are generally used with a miter saw or a small veneer saw, the invention may be also used with a razor-like cutting blade, with workpieces of suitable material; accordingly the term saw, as used herein, includes such a blade.

The invention being thus disclosed, further variations and modifications will occur to those skilled in the art, and all such variations and modifications are intended to be included within the scope of the invention, as defined by the following claims.

What is claimed is:

1. A modelmaker's miter jig having a body comprising
   a work support surface having a longitudinal axis,
   a guide wall rising from the work support surface along the axis, and including
   (i) means for guiding a saw at a selected angle across the axis over the work surface,
   (ii) an alignment face for aligning the axis with the edge of a table top by abutting against such edge, and
   (iii) a clamp engaging face for engaging and securing a c-clamp in a plane in a plane perpendicular to the axis whereby the miter jig may be fixedly secured to a table top by a said c-clamp, wherein the clamp engaging face is the inner surface of an opening formed in the guide wall, parallel to the work support surface, for engaging an arm of a c-clamp directed parallel to said work support surface.

2. A jig according to claim 1, wherein the body further includes a plurality of downwardly extending legs extending from said work support surface.

3. A jig according to claim 2, wherein said opening extends through two or more of the legs.

4. A jig according to claim 2, wherein the opening is a channel in the guide wall.

5. A jig according to claim 2, wherein the body has a channel formed therein parallel to the axis, and wherein the jig further includes a rule and a stop cooperative therewith slideably mounted for motion along the channel and protruding above the work surface.

6. A jig according to claim 5, further including means for locking the stop member in a desired position with respect to the saw guiding means.

7. A jig according to claim 6, whrein the rule includes first and second graduated scales.

8. A jig according to claim 7, wherein the work surface includes cut marks theron representative of positions of cuts at selected angles.

9. A jig according to claim 8, formed substantially as an extrusion.

* * * * *

UNITED STATES PATENT AND TRADEMARK OFFICE
CERTIFICATE OF CORRECTION

PATENT NO. : 4,712,462
DATED : December 15, 1987
INVENTOR(S) : Sava Cvek

It is certified that error appears in the above-identified patent and that said Letters Patent is hereby corrected as shown below:

Column 3, line 42, after "i.e." insert --,--.

Column 3, line 54, replace "geometrics" with --geometries--.

Column 3, line 60, after "42'''" insert --.--.

Column 5, line 26, after "in a plane" delete --in a plane--.

Signed and Sealed this

Seventeenth Day of May, 1988

Attest:

DONALD J. QUIGG

Attesting Officer

Commissioner of Patents and Trademarks